United States Patent
Shoji

(10) Patent No.: US 8,975,794 B2
(45) Date of Patent: Mar. 10, 2015

(54) STARTER INCLUDING NOISE REDUCTION FILTER

(75) Inventor: Yoichi Shoji, Anjo (JP)

(73) Assignee: DENSO CORPORATION, Kariya (JP)

( * ) Notice: Subject to any disclaimer, the term of this patent is extended or adjusted under 35 U.S.C. 154(b) by 390 days.

(21) Appl. No.: 13/593,027

(22) Filed: Aug. 23, 2012

(65) Prior Publication Data

US 2013/0082553 A1   Apr. 4, 2013

(30) Foreign Application Priority Data

Oct. 4, 2011 (JP) .................. 2011-219934

(51) Int. Cl.
| | |
|---|---|
| H02K 11/02 | (2006.01) |
| F02N 11/02 | (2006.01) |
| H02K 11/00 | (2006.01) |
| H02K 5/22 | (2006.01) |
| F02N 11/08 | (2006.01) |
| F02N 15/00 | (2006.01) |

(52) U.S. Cl.
CPC ............... F02N 11/02 (2013.01); H02K 11/00 (2013.01); H02K 5/22 (2013.01); H02K 5/225 (2013.01); H02K 11/024 (2013.01); F02N 11/087 (2013.01); F02N 2250/02 (2013.01); F02N 15/006 (2013.01); F02D 2400/22 (2013.01); F02D 2400/18 (2013.01)
USPC ............... 310/71; 310/51; 310/68 R; 310/89; 318/452

(58) Field of Classification Search
CPC ......... H02K 5/22; H02K 5/224; H02K 11/00; H02K 11/024; F02N 11/02; F02N 11/024; F02N 11/0855; F02N 11/087; F02N 15/006; F02N 2250/02; F02D 2400/18; F02D 2400/21; F02D 2400/22

USPC ................. 310/51, 68 R, 71, 89; 318/452
IPC ........................................ H02K 11/02
See application file for complete search history.

(56) References Cited

U.S. PATENT DOCUMENTS

| | | | | |
|---|---|---|---|---|
| 4,559,455 | A | * | 12/1985 | Tanaka ................... 290/38 R |
| 5,148,073 | A | * | 9/1992 | Tamura ..................... 310/239 |
| 5,777,409 | A | * | 7/1998 | Keck ......................... 310/71 |
| 6,608,414 | B1 | * | 8/2003 | Conley ....................... 310/89 |
| 7,755,232 | B2 | * | 7/2010 | Winkler et al. .............. 310/72 |
| 2005/0040717 | A1 | * | 2/2005 | Bogdan et al. ............... 310/71 |
| 2008/0084129 | A1 | * | 4/2008 | Utsunomiya et al. .......... 310/71 |
| 2009/0027147 | A1 | * | 1/2009 | Andoh ....................... 335/196 |
| 2009/0295240 | A1 | * | 12/2009 | Ono et al. ................... 310/71 |
| 2010/0264765 | A1 | * | 10/2010 | Haruno et al. ............... 310/71 |
| 2013/0082553 | A1 | * | 4/2013 | Shoji ......................... 310/71 |

FOREIGN PATENT DOCUMENTS

DE   10 2008 001 570 A1   11/2009

* cited by examiner

Primary Examiner — John K Kim
(74) Attorney, Agent, or Firm — Oliff PLC

(57) ABSTRACT

The starter includes a noise reduction filter having at least one capacitor, a positive side lead plate connected to a first end of the capacitor and a negative side lead plate connected to a second end of the capacitor, the positive side lead plate being connected to a motor lead wire of a motor through a connection fitting, the negative side lead plate being fixed and ground-connected to a frame of the motor. The connection fitting includes a connection arm connected to the positive side lead plate and a cylindrical joint section integrally formed with the connection arm, the joint section being fitted in a root section of the motor lead wire drawn outside the frame through a grommet attached to the frame to be electrically connected to the motor lead wire.

3 Claims, 4 Drawing Sheets

STARTER INCLUDING NOISE REDUCTION FILTER

This application claims priority to Japanese Patent Application No. 2011-219934 filed on Oct. 4, 2011, the entire contents of which are hereby incorporated by reference.

BACKGROUND OF THE INVENTION

1. Field of the Invention

The present invention relates to a starter including a noise reduction filter for reducing noise emitted from a motor of the starter.

2. Description of Related Art

There is an increasing number of vehicles provided with a system for automatically stopping the engine by cutting supply of fuel to the engine when the vehicle is stopped at an intersection for example (the system being generally called "idling stop system") in order to reduce carbon dioxide emission and improve fuel economy of the vehicle. When a vehicle driver of such a vehicle performs an operation to start the vehicle after the engine was stopped by the idling stop system, the starter of the vehicle starts to operate to automatically start the engine in accordance with a command received from an ECU (Electronic Control Unit). Meanwhile, if the starter is of the type including a commutator motor, since sparks occur between the commutator and brushes when the motor is rotating, it may occur that the vehicle driver and passengers feel uncomfortable each time the engine is automatically restarted because such sparks cause noise in a radio receiver or the like.

German patent application laid-open No. 102008001570 describes a structure where a noise reduction filter including a capacitor circuit is connected in parallel with a motor of a starter to cope with this problem.

However, in this structure, a motor lead wire is welded to a metal terminal connected to the brush of the motor and drawn outside the starter, and the noise reduction filter is electrically and mechanically connected to this metal terminal. For starters whose metal terminal is not drawn outside, it is not possible to carry out the step to connect the noise reduction filter to the metal terminal in the starter assembly line.

SUMMARY

An exemplary embodiment provides a starter including:
an electromagnetic switch including an electrical contact interposed in a power supply line through a battery terminal and a motor terminal thereof, and configured to open and close the electrical contact in interlock with on/off operation of a solenoid thereof;
a motor for generating torque by being supplied with electric power from a battery through a motor lead wire connected to the motor terminal when the electrical contact is closed; and
a noise reduction filter connected to the power supply line in parallel with the motor for suppressing noise emitted from the motor;
wherein
the motor lead wire is connected to a brush or a field winding of the motor at a first end thereof drawn inside a frame of the motor through a grommet attached to the frame, and connected to the motor terminal at a second end thereof drawn outside the frame through the grommet,
the noise reduction filter includes at least one capacitor, a positive side lead plate connected to a first end of the capacitor and a negative side lead plate connected to a second end of the capacitor, the positive side lead plate being connected to the motor lead wire through a connection fitting, the negative side lead plate being fixed and ground-connected to the frame, and
the connection fitting includes a connection arm connected to the positive side lead plate and a cylindrical joint section integrally formed with the connection arm, the joint section being fitted in a root section of the motor lead wire drawn outside the frame of the motor through the grommet to be electrically connected to the motor lead wire.

According to the exemplary embodiment, there is provided a starter having the structure enabling retrofitting a noise reduction filter to the frame of a motor of the starter even if the starter is not provided with such a metal terminal connected to a brush of the motor and drawn outside the frame.

Other advantages and features of the invention will become apparent from the following description including the drawings and claims.

PREFERRED EMBODIMENTS OF THE INVENTION

Figure 1:
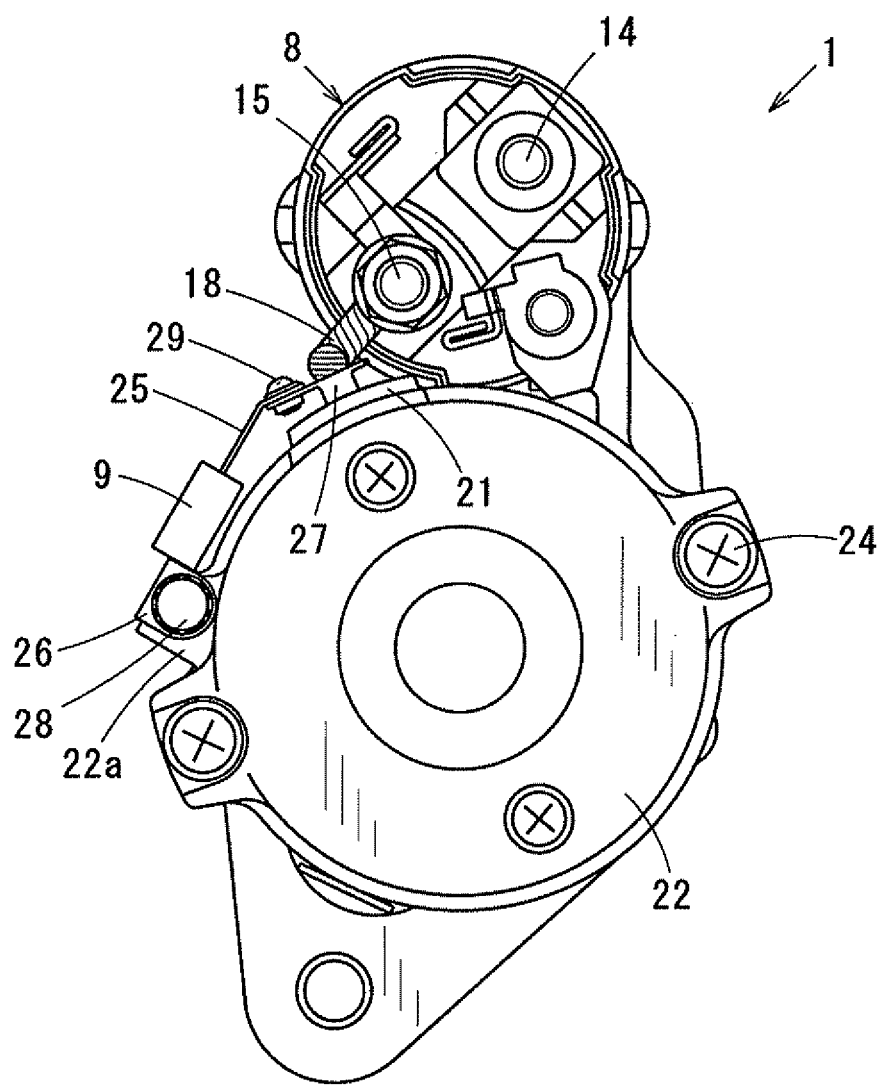
FIG. 1 is a rear view of a starter including a noise reduction filter as viewed from the side of the rear end of the starter (the side of the end frame of the starter) according to an embodiment of the invention.
Figure 3:
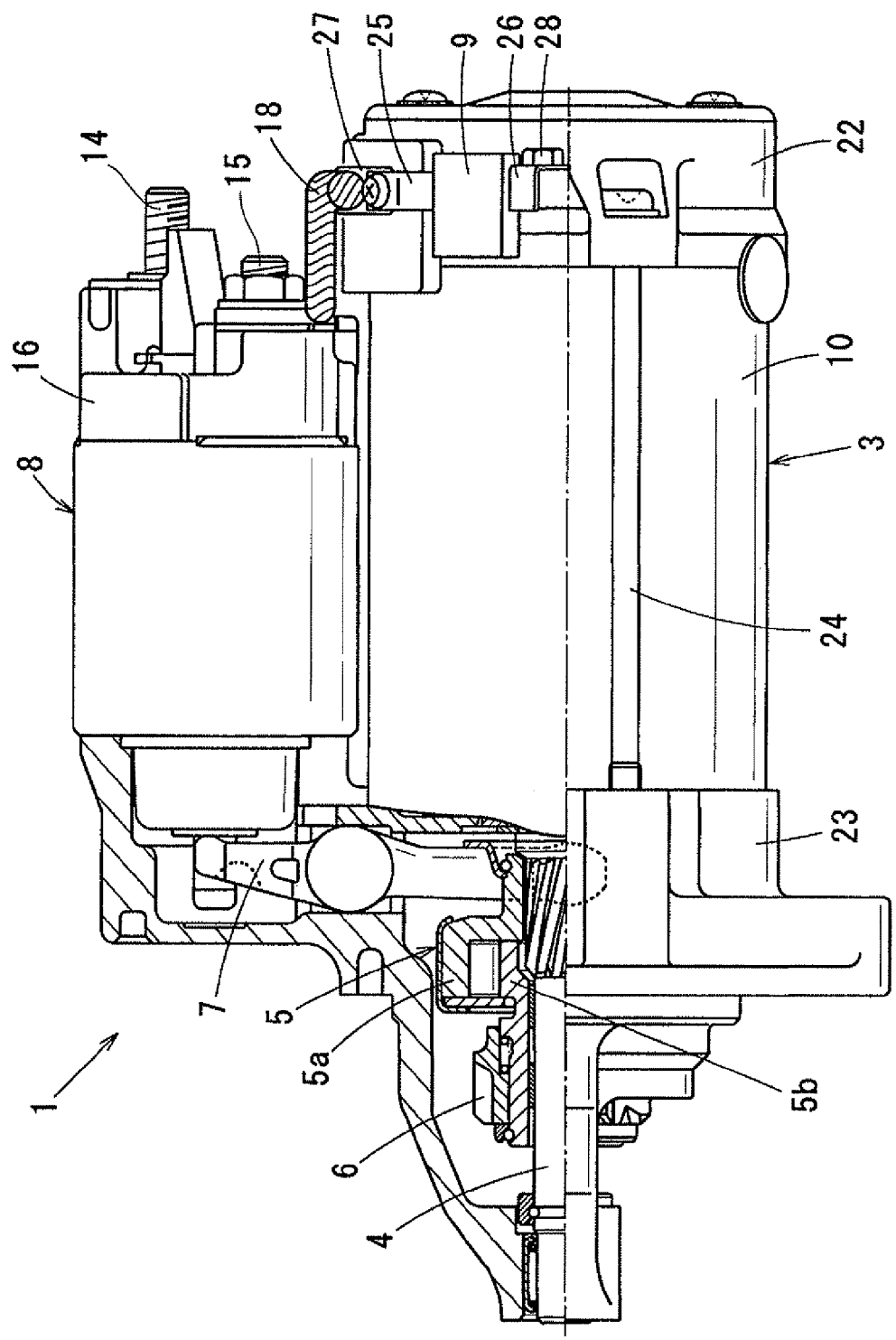
FIG. 3 is a side view of the starter according to the embodiment of the invention.

FIG. 1 is a rear view of a starter 1 including a noise reduction filter as viewed from the side of the rear end of the starter (from the side of the end frame of the starter) according to an embodiment of the invention. As shown in FIG. 3, the starter 1 includes a motor 3, an output shaft 4, a clutch 5, a pinion 6, a shift lever 7, an electromagnetic switch 8 and a noise reduction filter 9. The motor 3 generates torque when supplied with power from a battery 2 (see FIG. 4). The output shaft 4 is driven by the motor 3. The rotation of the output shaft 4 is transmitted to the pinion 6 through the clutch 5. The electromagnetic switch 8 drives the shift lever 7 using the attraction force of an electromagnet thereof to push out the pinion 6 integrally with the clutch 6 in the opposite motor direction (in the leftward direction in FIG. 3), and interrupts a current supplied to the motor 3 by opening and closing a later-explained main contact. The noise reduction filter 9 is for suppressing noise emitted from the motor 3.

The motor 3 is a DC commutator motor including a field system constituted of permanent magnets or a field winding disposed inside a yoke 10 which forms a magnetic circuit, an armature 3a (see FIG. 4) rotatably disposed inside the field system and brushes 11 (see FIG. 4) which slide on the outer periphery of a commutator when the armature 3a rotates. The output shaft 4 is disposed coaxially with the armature 3a by the provision of a not-shown reduction gear (a planetary reduction gear, for example). The torque generated by the motor 3 and increased by the reduction gear is transmitted to the output shaft 4 causing the output shaft 4 to rotate. The clutch 5 is a one-way clutch which transmits the torque of the output shaft 4 from the outer 5a thereof to the inner tube 5b thereof, while interrupting torque transmission from the inner tube 5b to the outer 5a. The pinion 6 is spline-fitted to the outer periphery of the inner tube 5b so that it rotates together with the inner tube 5b.

Figure 4:
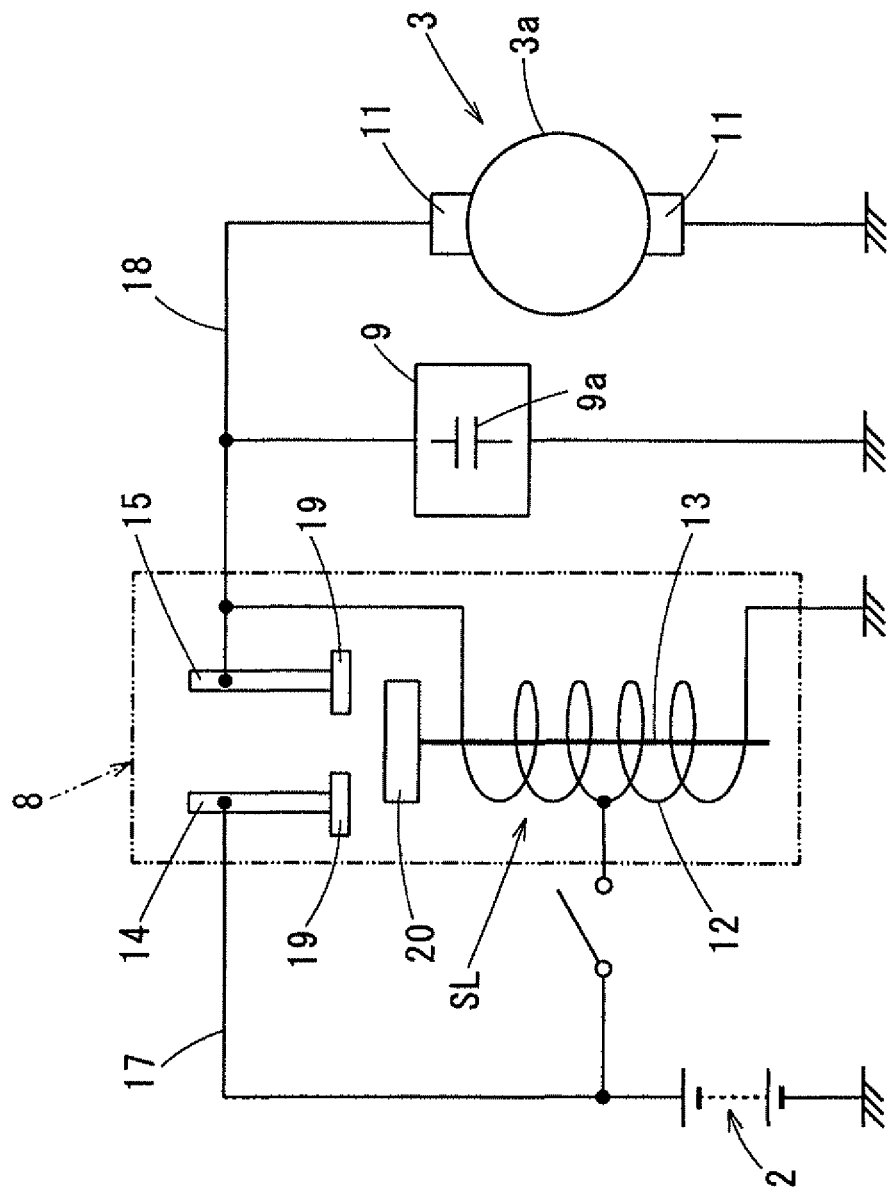
FIG. 4 is an electrical circuit diagram of the starter according to the embodiment of the invention.

As shown in FIG. 4, the electromagnetic switch 8 includes terminal bolts 14 and 15, a solenoid SL having an excitation coil 12, a plunger 13 and a resin cover 16 (see FIG. 3). The terminal bolts 14 and 15 are fixed to the resin cover 16. The solenoid SL serves as an electromagnet for attracting the plunger 13 when the excitation coil 12 is energized. The main contact is disposed inside the resin cover 16. The terminal bolt 14 is a B-terminal bolt (battery terminal) connected to the positive terminal of the battery 2 through a cable 17. The terminal bolt 15 is an M-terminal bolt (motor terminal) connected with a later explained motor lead wire 18. As shown in FIG. 4, the main contact is constituted of a pair of fixed contacts 19 and a movable contact 20. The fixed contacts 19 are interposed in a power supply line of the motor 3 through the B-terminal bolt 14 and the M-terminal bolt 15. The movable contact 20 makes and breaks electrical connection between the fixed contacts 19 in interlock with movement of the plunger 13.

Figure 2:
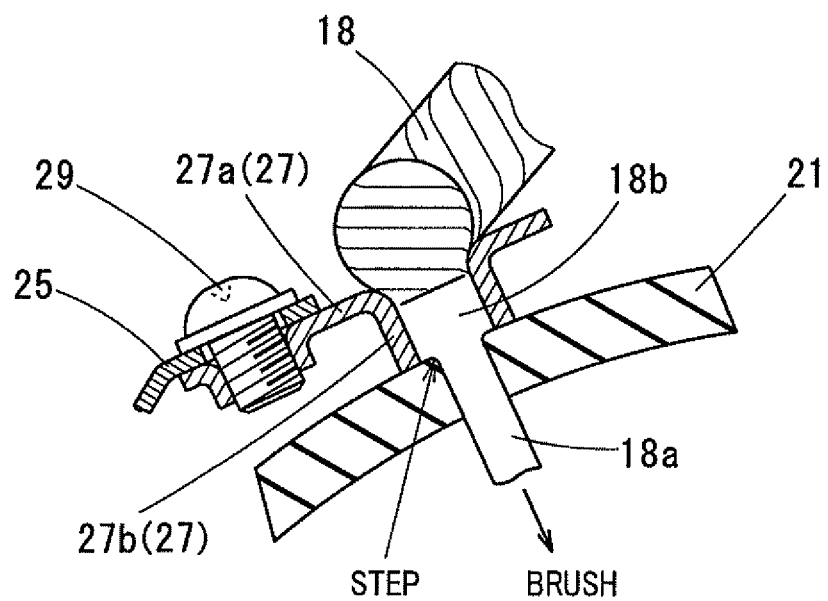
FIG. 2 is a cross-sectional view of the starter showing a fitting structure of a connection fitting.

As shown in FIG. 2, the motor lead wire 18 is connected to the positive side brush 11 at its one end which is inserted through a gum grommet 21 fitted to the frame of the motor 3 and drawn inside the frame, and is connected to the M-terminal bolt 15 (see FIG. 3) at its other end drawn outside through the grommet 21. Incidentally, in a case where the field system of the motor 3 is constituted of not permanent magnets but a field winding, it is possible to connect one end of the motor lead wire 18 to the field winding through a connection bar. As shown in FIG. 3, the frame of the motor 3 is constituted of the yoke 10 and an end fame 22 fitted to the opening of the rear end (the right end in FIG. 3) of the yoke 10 so as to close the opening. The end frame 22 is fixed to a front housing 22 of the starter by tightening through bolts 24.

The noise reduction filter 9 includes at least one capacitor 9a (see FIG. 4), a positive side lead plate 25 connected to one end of the capacitor 9a and a negative side lead plate 26 connected to the other end of the capacitor 9a. The noise reduction filter 9 is connected to the power supply line through the lead plates 25 and 26 in parallel with the motor 3. More specifically, as shown in FIG. 1, the positive side lead plate 25 is connected to the motor lead wire 18 through a connection fitting 27, and the negative side lead plate 26 is fixed to a pedestal 22a formed in the end frame 22 of the motor 3 by a bolt 28. As shown in FIG. 1, the pedestal 22a is formed so as to project radially outward from the outer periphery of the end frame 22.

As shown in FIG. 2, the connection fitting 27 includes a connection arm 27a connected to the positive side lead plate 25, and a cylindrical joint section 27b formed integrally with this connection arm 27a. The joint section 27b is fitted in a root section of the motor lead wire 18 drawn outside the motor 3 through the grommet 21 to be electrically connected to the motor lead wire 18. The connection fitting 27a has a screw hole formed using a burring tap or the like. The positive side lead plate 25 and the connection arm 27a are electrically connected and mechanically fixed to each other by aligning a circular hole formed in the positive side lead plate 25 and the screw hole to each other, inserting a screw 29 into the circular hole and tightening the screw 29 to the screw hole.

The joint section 27b, which is formed by burring work or the like, is pressure-inserted and fixed to the outer periphery of a compressed section formed in one end side of the motor lead wire 18. The motor lead wire 18 is a twisted wire constituted of thin conductor wires twisted one another. The one end side of the motor lead wire 18 is compressed in the radial direction to form the compressed section. As shown in FIG. 2, the diameter of a portion of the compressed section inserted into the grommet 21 (referred to as the "grommet-inserted portion 18a" hereinafter) is different from the diameter of a portion of the compressed section fitted with the joint section 27b (referred to as the "joint-fitted portion 18b" hereinafter). The grommet-inserted portion 18a is slightly thinner than the joint-fitted portion 18b, so that a step is present between the grommet-inserted portion 18a and the joint-fitted portion 18b. This step serves as a positioning reference with respect to the grommet 21. That is, as shown in FIG. 2, the motor lead wire 18 is mounted such that the grommet-inserted portion 18a is inserted into the grommet 21 until the step abuts against the outer periphery of the grommet 21. The joint section 27b is fitted to the outer periphery of the joint-fitted portion 18b drawn outside from the grommet 21 (the root portion of the motor lead wire 18), and the front end surface of the joint section 27b abuts against the outer periphery of the grommet 21.

The embodiment of the invention described above provides the following advantages. The positive side lead plate 25 of the noise reduction filter 9 can be electrically connected to the motor lead wire 18 through the connection fitting 27 by fitting the cylindrical joint section 27b formed in the connection fitting 27 to the joint fitting section 18b (the root portion) of the motor lead wire 18. Therefore, it is not necessary to join the connection fitting 27 to the motor lead wire 18 within the motor 3, and it is possible to retrofit the noise reduction filter 9 to the outside of the frame after the starter 1 is assembled. Hence, according to this embodiment, it is not necessary to make changes to the existing assembly line of the starter 1.

The noise reduction filter 9 can be easily connected to the connection fitting 27 by overlapping the positive side lead plate 25 on the connection arm 27a in the thickness direction and screwing them together. The noise reduction filter 9 is fixed by tightening the negative side lead plate 26 to the pedestal 22a formed in the end frame 22 of the motor 3 using the bolt 28. This structure enables fixing the noise reduction filter 9 easily to the end frame 22 of the motor 3 utilizing the negative side lead plate 26 without using an additional part such as a stay. Hence, according to this embodiment, it is possible to improve resistance to vibration of the starter.

The above explained preferred embodiments are exemplary of the invention of the present application which is described solely by the claims appended below. It should be understood that modifications of the preferred embodiments may be made as would occur to one of skill in the art.

What is claimed is:

1. A starter comprising:
   an electromagnetic switch including an electrical contact interposed in a power supply line through a battery terminal and a motor terminal thereof, and configured to open and close the electrical contact in interlock with on/off operation of a solenoid thereof;
   a motor for generating torque by being supplied with electric power from a battery through a motor lead wire connected to the motor terminal when the electrical contact is closed; and
   a noise reduction filter connected to the power supply line in parallel with the motor for suppressing noise emitted from the motor;
   wherein
   the motor lead wire is connected to a brush or a field winding of the motor at a first end thereof drawn inside a frame of the motor through a grommet attached to the frame, and connected to the motor terminal at a second end thereof drawn outside the frame through the grommet, the noise reduction filter includes at least one capacitor, a positive side lead plate connected to a first end of the capacitor and a negative side lead plate connected to a second end of the capacitor, the positive side lead plate being connected to the motor lead wire through a connection fitting, the negative side lead plate being fixed and ground-connected to the frame, and the connection fitting includes a connection arm connected to the positive side lead plate and a cylindrical joint section integrally formed with the connection arm, the joint section being fitted in a root section of the motor lead wire drawn outside the frame of the motor through the grommet to be electrically connected to the motor lead wire.

2. The starter according to claim 1, wherein the noise reduction filter is fixed to the connection fitting by overlapping and screwing the positive side lead plate and the connection arm together in a thickness direction of the positive side lead plate and the connection arm.

3. The starter according to claim 1, wherein the noise reduction filter is screwed at the negative side lead plate to a pedestal provided integrally with the frame of the motor.

* * * * *